US012703263B2

(12) United States Patent
Muigg et al.

(10) Patent No.: US 12,703,263 B2
(45) Date of Patent: Aug. 11, 2026

(54) CRAWLER VEHICLE AND METHOD FOR MANAGING THE OPERATION OF SAID CRAWLER VEHICLE

(71) Applicant: PRINOTH S.P.A., Vipiteno (IT)

(72) Inventors: Andreas Muigg, Vipiteno (IT); Martin Kirchmair, Vipiteno (IT)

(73) Assignee: PRINOTH S.P.A., Vipiteno (IT)

( * ) Notice: Subject to any disclaimer, the term of this patent is extended or adjusted under 35 U.S.C. 154(b) by 356 days.

(21) Appl. No.: 18/515,498

(22) Filed: Nov. 21, 2023

(65) Prior Publication Data

US 2024/0174121 A1 May 30, 2024

(30) Foreign Application Priority Data

Nov. 25, 2022 (IT) ........................ 102022000024399

(51) Int. Cl.

*B60L 53/80* (2019.01)
*B60L 50/60* (2019.01)
*B60S 5/06* (2019.01)
*B62D 55/08* (2006.01)
*E01H 4/02* (2006.01)

(52) U.S. Cl.

CPC ............... *B60L 53/80* (2019.02); *B60L 50/60* (2019.02); *B60S 5/06* (2013.01); *B62D 55/08* (2013.01); *B60L 2200/40* (2013.01); *E01H 4/02* (2013.01)

(58) Field of Classification Search

CPC ........... B60K 1/04; B60L 50/60; B60L 50/50; B62D 55/08

See application file for complete search history.

(56) References Cited

U.S. PATENT DOCUMENTS 8,327,960 B2 * 12/2012 Couture ............... B62D 55/065 180/9.1
8,413,752 B2 * 4/2013 Page .................. B62D 25/2054 180/68.5
11,364,959 B1 * 6/2022 Boe ........................ B62D 55/06
11,407,298 B1 8/2022 Boe et al.
2023/0202288 A1 * 6/2023 Kirchmair ................ B60K 1/04 180/308
2024/0409000 A1 * 12/2024 Ditillo ..................... B60L 50/66

FOREIGN PATENT DOCUMENTS

CN 115 179 908 10/2022
WO 2021/245621 A1 12/2021

OTHER PUBLICATIONS

Italian Search Report and Written Opinion for Application No. IT 202200024399 dated Jun. 7, 2023.

* cited by examiner

*Primary Examiner* — Minnah L Seoh
*Assistant Examiner* — Hosam Shabara
(74) *Attorney, Agent, or Firm* — Neal, Gerber & Eisenberg LLP

(57) ABSTRACT

A crawler vehicle has a frame; a first energy storage assembly configured to be removed from the crawler vehicle and to be replaced by a further first energy storage assembly; a propulsion system configured to be powered by the first energy storage assembly; a connection interface configured to selectively and relatively quickly connect/disconnect the first energy storage assembly to/from the propulsion system; a first motorized track and a second motorized track; and a transmission assembly configured to transmit power from the propulsion system to the first and to the second track.

14 Claims, 6 Drawing Sheets

CRAWLER VEHICLE AND METHOD FOR MANAGING THE OPERATION OF SAID CRAWLER VEHICLE

PRIORITY CLAIM

This application claims the benefit of and priority to Italian Patent Application No. 102022000024399, filed on Nov. 25, 2022, the entire contents of which is incorporated by reference herein.

TECHNICAL FIELD

The disclosure relates to a crawler vehicle, in particular for preparing ski runs, and to a method for managing the operation of the crawler vehicle.

BACKGROUND

Generally speaking, a crawler vehicle of the type identified above comprises a frame; a cabin mounted on the frame; a propulsion system mounted on the frame; drive wheels operated by the propulsion system; and work tools powered by the propulsion system.

The propulsion system of the aforesaid crawler vehicle typically comprises an internal combustion engine, a supply pump, a mechanical transmission configured to transmit power from the internal combustion engine to the supply pump and hydraulic actuators, which are supplied by the supply pump and are configured to operate the drive wheels and the work tools. In this configuration, the internal combustion engine emits polluting exhaust gases. A further drawback of known crawler vehicles lies in the scarce energy efficiency caused by the difficulty in controlling the power delivered by the internal combustion engine so as to have the internal combustion engine operate at its maximum efficiency point regardless of the energy need of the crawler vehicle.

In the last decades, the increasing attention towards global pollution reduction has led to the development of crawler vehicles powered by alternative powering systems, such as electric batteries.

Generally speaking, alternative powering systems allow for a highly efficient energy transmission and lead to zero emissions of polluting gases, though they require relatively long charging times.

SUMMARY

The object of the disclosure is to provide a crawler vehicle, in particular for preparing ski runs, which reduces certain of the drawbacks of certain of the prior art.

In particular, the object of the disclosure is to provide a crawler vehicle of the aforesaid type, which solves the technical drawback of the relatively long charging times of the powering system.

According to the disclosure, there is provided a crawler vehicle, in particular for preparing ski runs, the crawler vehicle comprising: a frame; a first energy storage assembly configured to be removed from the crawler vehicle and to be replaced by a further first energy storage assembly; a propulsion system configured to be powered by the first energy storage assembly; a connection interface configured to selectively and relatively quickly connect/disconnect the first energy storage assembly to/from the propulsion system; a first motorized track and a second motorized track; and a transmission assembly configured to transmit power from the propulsion system to the first and to the second track.

Accordingly, when the first power storage assembly is substantially discharged, the first energy storage assembly can be replaced by a further first energy storage assembly in a relatively simple and relatively quick manner, with no need to wait for the time needed by the first energy storage system to be recharged. In this way, standstill times, during which the crawler vehicle cannot operate, are significantly reduced.

In particular, the first energy storage assembly comprises a first mechanical connector and a first power connector; the connection interface comprising a second mechanical connector configured to engage, in a releasable manner, the first mechanical connector and a second power connector configured to be connected to the first power connector so as to transmit power to the propulsion system. In this way, the first energy storage assembly can relatively simply and relatively quickly be connected/disconnected to/from the connection interface. The connection/disconnection operations between the first energy storage assembly and the connection interface can be automated and/or be carried by an operator.

In particular, the crawler vehicle comprises a cabin mounted on the frame; the connection interface being arranged behind the cabin with respect to a travelling direction of the crawler vehicle. In this way, the first energy storage assembly can be connected/disconnected to/from the back of the cabin.

In particular, the connection interface comprises at least one guide; the first energy storage assembly comprising at least one sliding element, which is configured to slide along the respective guide so as to connect/disconnect the first energy storage assembly to/from the connection interface. In this way, the relative simplicity and the relative quickness of the first energy storage assembly removal and replacement operations are increased.

In particular, the crawler vehicle comprises a position sensor assembly configured to detect the relative position of the connection interface with respect to a replacement device of the first energy storage assembly. In certain embodiments, the position sensor assembly comprises a lidar and/or a radar and/or a video camera and/or a GPS sensor. As such, a position signal can be delivered to a control unit to automate the operations to be carried out to connect/disconnect the first energy storage assembly to/from the connection interface, so as to automatically control the positioning of the connection interface relative to the replacement device. In addition, a position signal can be delivered to an operator so as to enable the operator to check for the correct positioning of the connection interface relative to the replacement device.

In particular, the crawler vehicle comprises a second energy storage assembly, which is configured to be removed from the crawler vehicle and to be replaced by a further second energy storage assembly, and a further connection interface, which, in certain instances is arranged under the cabin, and is configured to selectively connect/disconnect the second energy storage assembly to/from the propulsion system in a relatively quick manner. In this way, the propulsion system can be powered through the second energy storage system and the second energy storage system can be connected/disconnected to/from the further connection interface under the cabin.

According to another embodiment, each energy storage assembly comprises at least one battery for storing electrical energy, so as to power propulsion system with electrical energy. According to a further embodiment, each energy storage assembly comprises at least one tank for storing hydrogen, so as to power propulsion system with hydrogen.

A further object of the disclosure is to provide a method for managing the operation of a crawler vehicle, which reduces certain of the drawbacks of certain of the prior art.

According to the disclosure, there is provided a method for managing the operation of a crawler vehicle, such as for preparing ski runs. The method of this embodiment includes: powering a propulsion system of the crawler vehicle by an energy storage assembly; transmitting power from the propulsion system to a first and a second track; removing the energy storage assembly from the crawler vehicle; and replacing the removed energy storage assembly with a further energy storage assembly. It should be appreciated that based on this method, the discharged energy storage assembly can relatively easily and relatively quickly be removed and replaced when needed, thus minimizing standstill times, during which the crawler vehicle cannot operate.

BRIEF DESCRIPTION OF THE DRAWINGS

Further features and advantages of the disclosure will be best understood upon perusal of the following description of a non-limiting embodiment thereof, with reference to the accompanying Figures, wherein.

DETAILED DESCRIPTION

Figure 1:
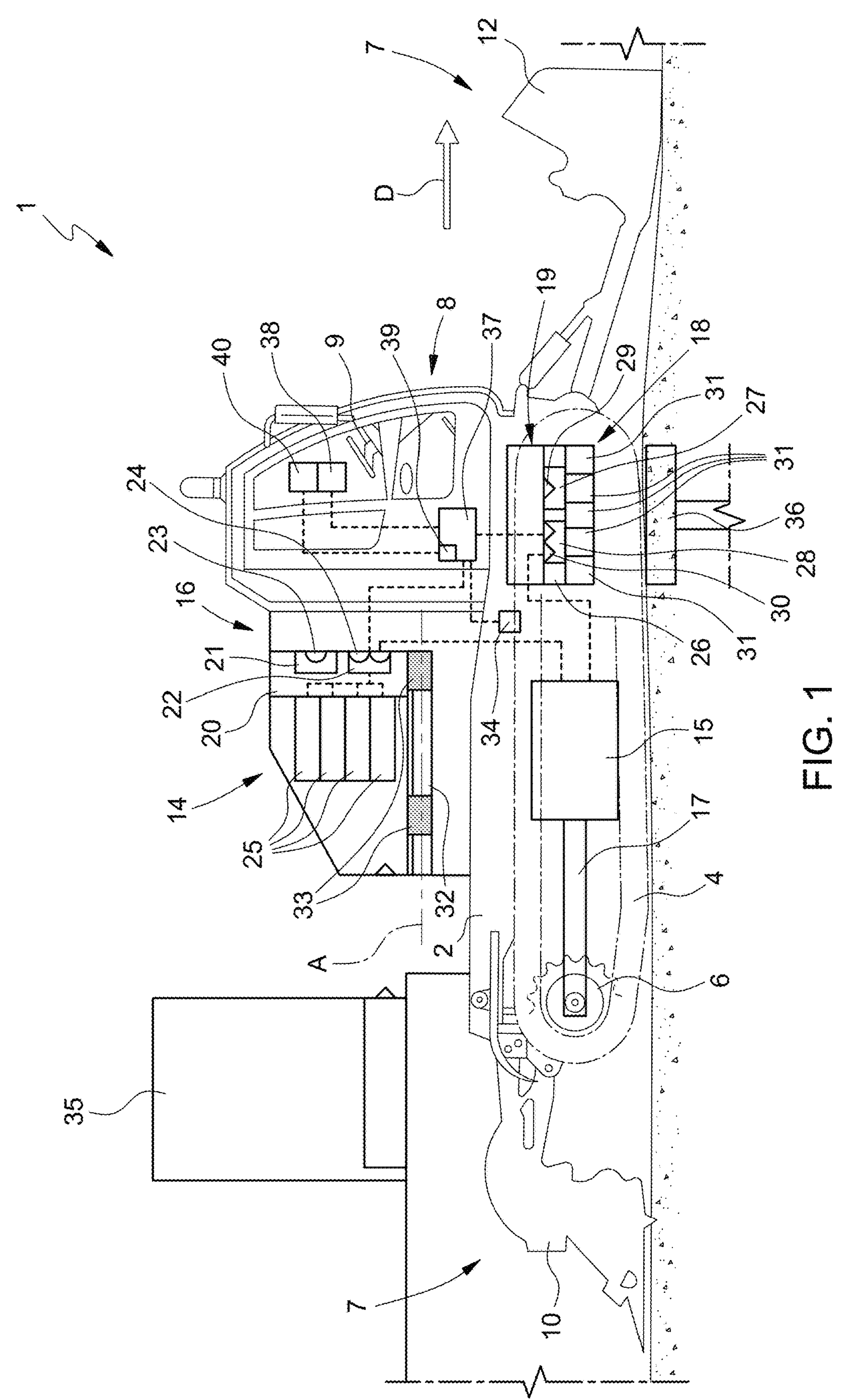
FIG. 1 is a side elevation view, with parts removed for greater clarity and schematic parts, of a crawler vehicle according to the disclosure.

With reference to FIG. 1, number 1 indicates, as a whole, a crawler vehicle for preparing ski runs. In particular, the crawler vehicle 1 is a snow groomer.

In more detail, the crawler vehicle 1 is used for the preparation of ski runs for Alpine skiing and/or ski runs for cross-country skiing and/or ramps for ski jumping and/or half-pipes and/or snow-parks. It should be appreciated that that, according to further embodiments, the crawler vehicle 1 can be used in agricultural operations, such as the harvesting and/or the handling of agricultural products and/or the ensilage of fodder and/or the harvesting and/or the handling of bagasse. Furthermore, the crawler vehicle 1 can comprise a mulcher arranged on the front side of the crawler vehicle 1 and can be used to mulch plants.

As seen in the drawings, the crawler vehicle 1 comprises a frame 2; a track 3 (FIG. 3); a track 4; a drive wheel 5 (FIG. 3) and a drive wheel 6 independent of one another and coupled to the track 3 (FIG. 3) and to the track 4, respectively, in order to operate the track 3 (FIG. 3) and the track 4, respectively; a plurality of hydraulically operated tools 7 connected to the frame 2; a cabin 8 mounted on the frame 2; and a user interface 9 arranged inside the cabin 8.

Figure 3:
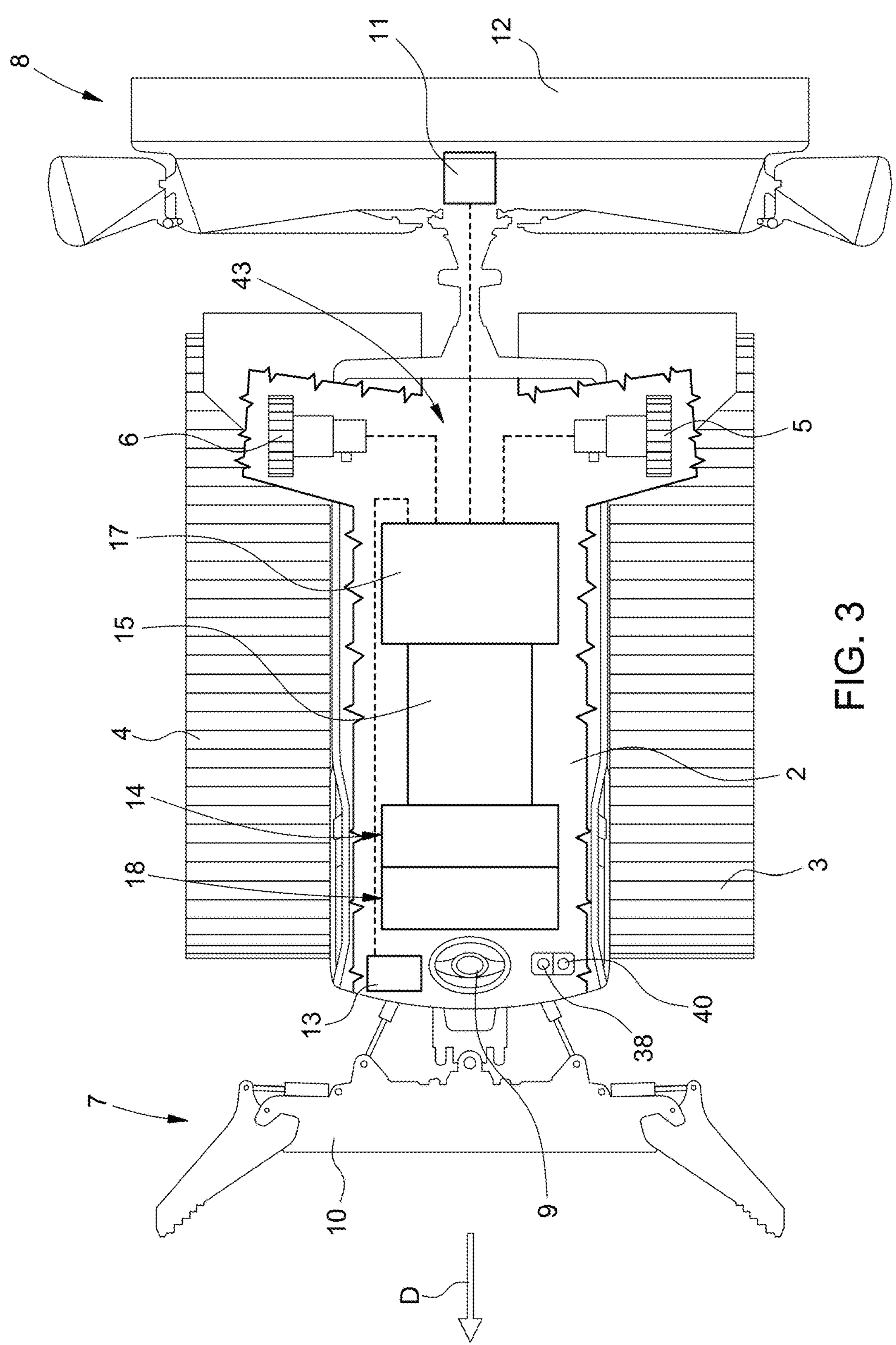
FIG. 3 is a view from the top, with parts removed for greater clarity and schematic parts, of the crawler vehicle of FIG. 1.

In the specific non-limiting case of the disclosure shown and discussed herein, the tools 7 comprise a tiller 10, which is connected to the frame 2 in a movable manner and is operated by a hydraulic motor 11 (FIG. 3), and a shovel 12, which is connected to the frame 2 in a movable manner and is operated by a hydraulic motor 13 (FIG. 3). For the purposes of this disclosure, the term "hydraulic motor" indicates any device for the conversion of hydraulic power into mechanical power and encloses, in its meaning, any type of hydraulic actuator and hydraulic cylinder.

According to a non-limiting embodiment of the disclosure, the cabin 8 is arranged in the front part of the crawler vehicle 1 and faces the shovel 12 in a travelling direction D.

The crawler vehicle 1 comprises an energy storage assembly 14 configured to be removed from the crawler vehicle 1 and to be replaced by a further energy storage assembly 14; a propulsion system 15 configured to be powered by the energy storage system 14; a connection interface 16 configured to selectively and relatively quickly connect/disconnect the energy storage assembly 14 to/from the propulsion system 15; and a transmission assembly 17 configured to transmit power from the propulsion system 15 to the drive wheels 5 and 6 and to the hydraulic motors 11 and 13 (FIG. 3). In particular, the connection interface 16 is arranged behind the cabin 8 with respect to the travelling direction D of the crawler vehicle 1. In more detail, the connection interface 16 is fixed on the frame 2 behind the cabin 8.

Furthermore, the crawler vehicle 1 comprises an energy storage assembly 18, which is configured to be removed from the crawler vehicle 1 and to be replaced by a further energy storage assembly 18, and a connection interface 19, which, in certain instances is arranged under the cabin 8, and is configured to selectively connect/disconnect the energy storage assembly 18 to/from the propulsion system 15 in a relative quick manner.

In particular, the connection interface 19 is fixed on the frame 2 under the cabin 8.

According to an alternative embodiment (not shown), the crawler vehicle 1 only comprise the energy storage assembly 14 and the connection interface 16 and lacks the energy storage assembly 18 and the connection interface 19.

According to a further alternative embodiment (not shown), the crawler vehicle 1 only comprise the energy storage assembly 18 and the connection interface 19 and lacks the energy storage assembly 14 and the connection interface 16.

With reference to FIG. 1, the energy storage assembly 14 comprises a support element 20, which is provided with a mechanical connector 21 and with a power connector 22 to be coupled to the connection interface 16.

The connection interface 16 comprises a mechanical connector 23 configured to engage, in a releasable manner, the mechanical connector 21 of the energy storage assembly 14 and a power connector 24 configured to be connected to the power connector 22 of the energy storage assembly 14 so as to transmit power to the propulsion system 15.

In the embodiment described and shown herein, the energy storage assembly 14 comprises at least one battery 25 configured to store electrical energy. In particular, the energy storage assembly 14 comprises a plurality of batteries 25 fixed to the support element 20. In this embodiment, the propulsion system 15 comprises an electric motor.

In particular, the energy storage assembly 18 comprises a support element 26, which is provided with a mechanical connector 27 and with a power connector 28 to be coupled to the connection interface 19.

The connection interface 19 comprises a mechanical connector 29 configured to engage, in a releasable manner, the mechanical connector 27 of the energy storage assembly 18 and a power connector 30 configured to be connected to the power connector 28 of the energy storage assembly 18 so as to transmit power to the propulsion system 15.

In the embodiment described and shown, the energy storage assembly 18 also comprises at least one battery 31 configured to store electrical energy. In particular, the energy storage assembly 18 comprises a plurality of batteries 31 fixed to the support element 26.

In particular, the power connectors 22 and 24 and the power connectors 28 and 30 are electrical connectors configured to be electrically connected to one another so as to transmit electrical power to the propulsion system 15.

In more detail, the mechanical connectors 21, 23, 27 and 29 are quick coupling and release connectors. According to an alternative embodiment, the mechanical connectors 21, 23, 27 and 29 comprise fixers, such as screws and bolts. It should be appreciated that the number and the arrangement of the mechanical connectors 21, 23, 27 and 29 and of the power connectors 22, 24, 28 and 30 can change without, for this reason, going beyond the scope of protection of the disclosure.

According to an embodiment, the connection interface 16 comprises at least one guide 32. The energy storage assembly 14 comprises at least one sliding element 33, which is configured to slide along the respective guide 32 so as to connect/disconnect the energy storage assembly 14 to/from the connection interface 16. In particular, the connection interface 16 comprises two guides 32, each extending along a respective longitudinal axis A substantially parallel to the travelling direction D.

Furthermore, the crawler vehicle 1 comprises a position sensor assembly 34 configured to detect the relative position of the connection interface 16 and/or of the connection interface 19 with respect to a respective replacement device 35, 36, which is configured to remove the respective energy storage assembly 14, 18 from the connection interface 16, 19 and to replace the removed energy storage assembly 14, 18 with a respective further energy storage assembly 14, 18. In particular, the position sensor assembly 34 comprises a lidar and/or a radar and/or a video camera and/or a GPS sensor.

The crawler vehicle 1 further comprises a control unit 37, which is in communication with the position sensor assembly 34 and is configured to control the position of the crawler vehicle 1 relative to the replacement device 35 or to the replacement device 36 depending on the relative position detected by the sensor assembly 34.

In addition or alternatively, the user interface 9 comprises an indicator 38 configured to emit a signal indicative of the relative position detected by the position sensor assembly 34.

Furthermore, the control assembly 37 comprises a charge sensor 39 configured to acquire the level of charge of the energy storage assemblies 14 and/or 18. The user interface 9 comprises an indicator 40 configured to emit a signal indicative of the level of charge acquired by the charge sensor 39.

In the specific case disclosed and shown in FIG. 1, the user interface 9 is a graphic interface, such as a screen, configured to display the indicators 38 and 40 so as to inform an operator controlling the crawler vehicle 1.

According to an embodiment, the replacement device 35 can comprise an automated equipment, such as a manipulator, or a crane. The replacement device 36 can comprise an automatic apparatus that can selectively be lifted/lowered from/to the ground.

Figure 2:
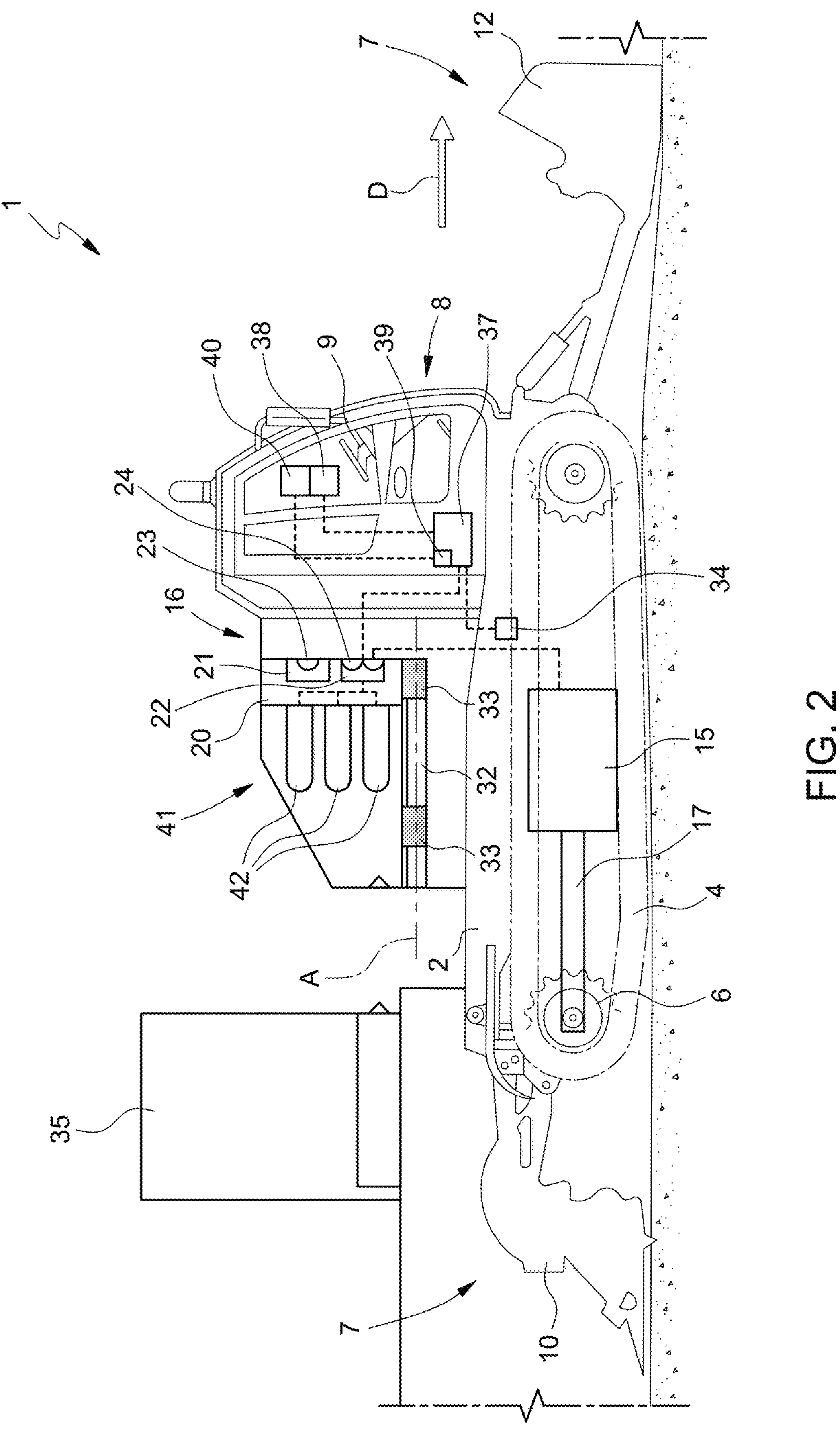
FIG. 2 is a side elevation view, with parts removed for greater clarity and schematic parts, of a further embodiment of the crawler vehicle of FIG. 1.

FIG. 2 shown a further embodiment of the disclosure, in which the crawler vehicle 1 is not provided with the energy storage assembly 18 and with the connection interface 19 and comprises an energy storage assembly 41 provided with at least one tank 42 to contain hydrogen (H2). In particular, the energy storage assembly 41 comprises a plurality of tanks 42 fixed to the support element 20. According to this embodiment, the propulsion system 15 comprises a hydrogen motor.

With reference to FIG. 3, the transmission assembly 17 comprises a hydraulic system 43, which is powered by the propulsion system 15 and is configured to transmit power to the drive wheels 5 and 6 and to the hydraulic motors 11 and 13. In particular, the hydraulic system 43 comprises a plurality of pumps.

Figure 4:
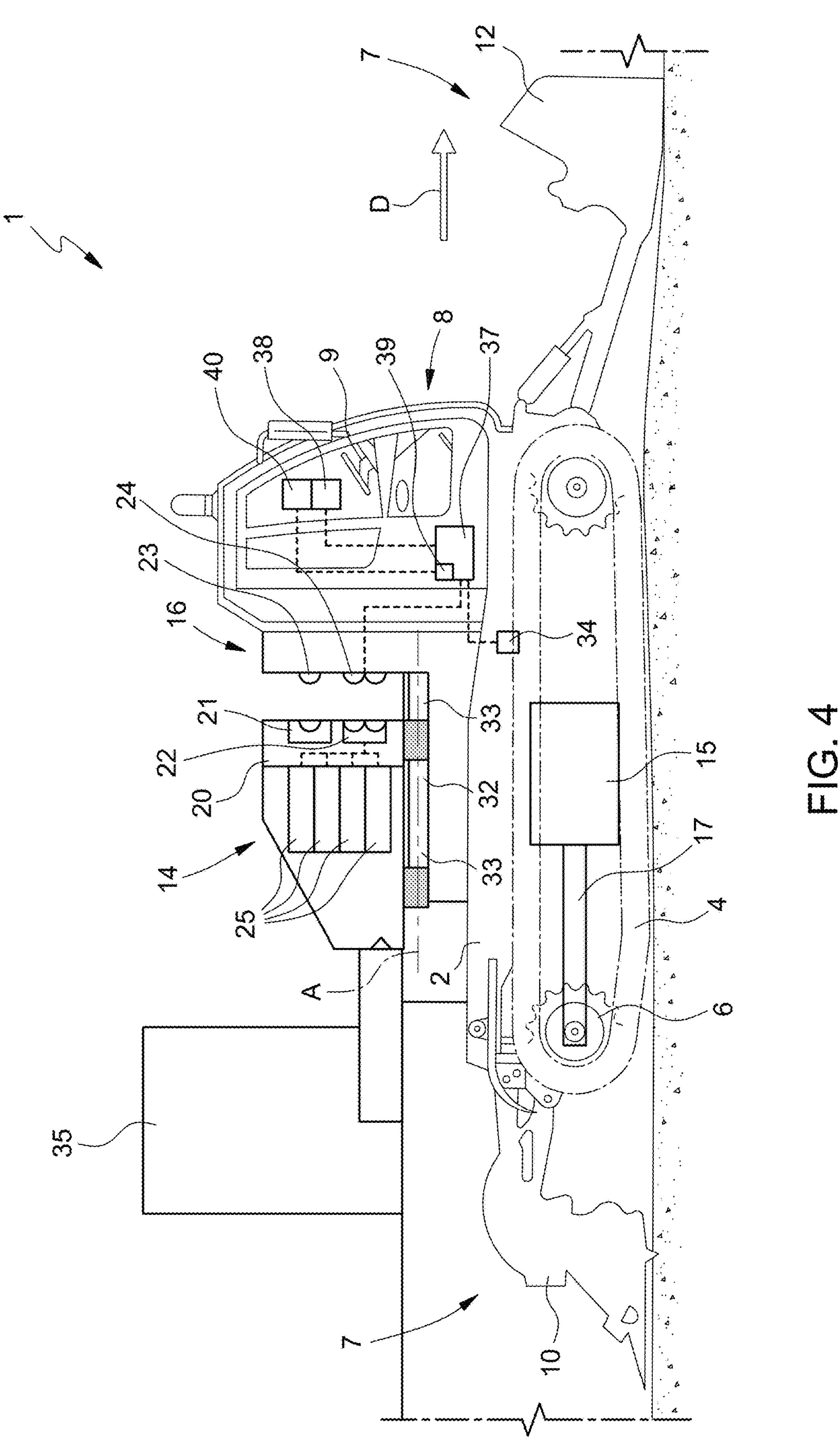
FIGS. 4 and 5 are side elevation views, with parts removed for greater clarity and schematic parts, of the crawler vehicle of FIG. 1 in respective operating configurations.

In use and with reference to FIG. 4, when the energy storage assembly 14 is substantially discharged, the crawler vehicle 1 is led to a replacement area, where the replacement device 35 is located so as to remove and replace the energy storage assembly 14.

The position sensor assembly 34 detects the relative position of the connection interface 16 with respect to the replacement device 35 and the control unit 37 controls the position of the crawler vehicle 1 with respect to the replacement device 35 as a function of the relative position detected by the position sensor assembly 34.

Alternatively or in addition, the indicator 38 of the user interface 9 emits a signal indicative of the relative position detected by the position sensor assembly 34 so as to enable the operator of the crawler vehicle 1 to check for the correct positioning of the connection interface 16.

Once the connection interface 16 is correctly positioned, the replacement device 35 starts the sliding of the discharged energy storage assembly 14 along the guides 32 so as to disconnect the mechanical connectors 21 and 23 and the power connectors 22 and 24 from one another and remove the discharged energy storage assembly 14 from the connection interface 16.

Once the discharged energy storage system 14 has been removed, the replacement device 35 connects a further charged energy storage assembly 14 to the connection interface 16. In particular, during the connection step, the replacement device 35 starts the sliding of the further charged energy storage assembly 14 along the guides 32, until the mechanical connectors 21 and 23 and the power connectors 22 and 24 are connected to one another.

Figure 5:
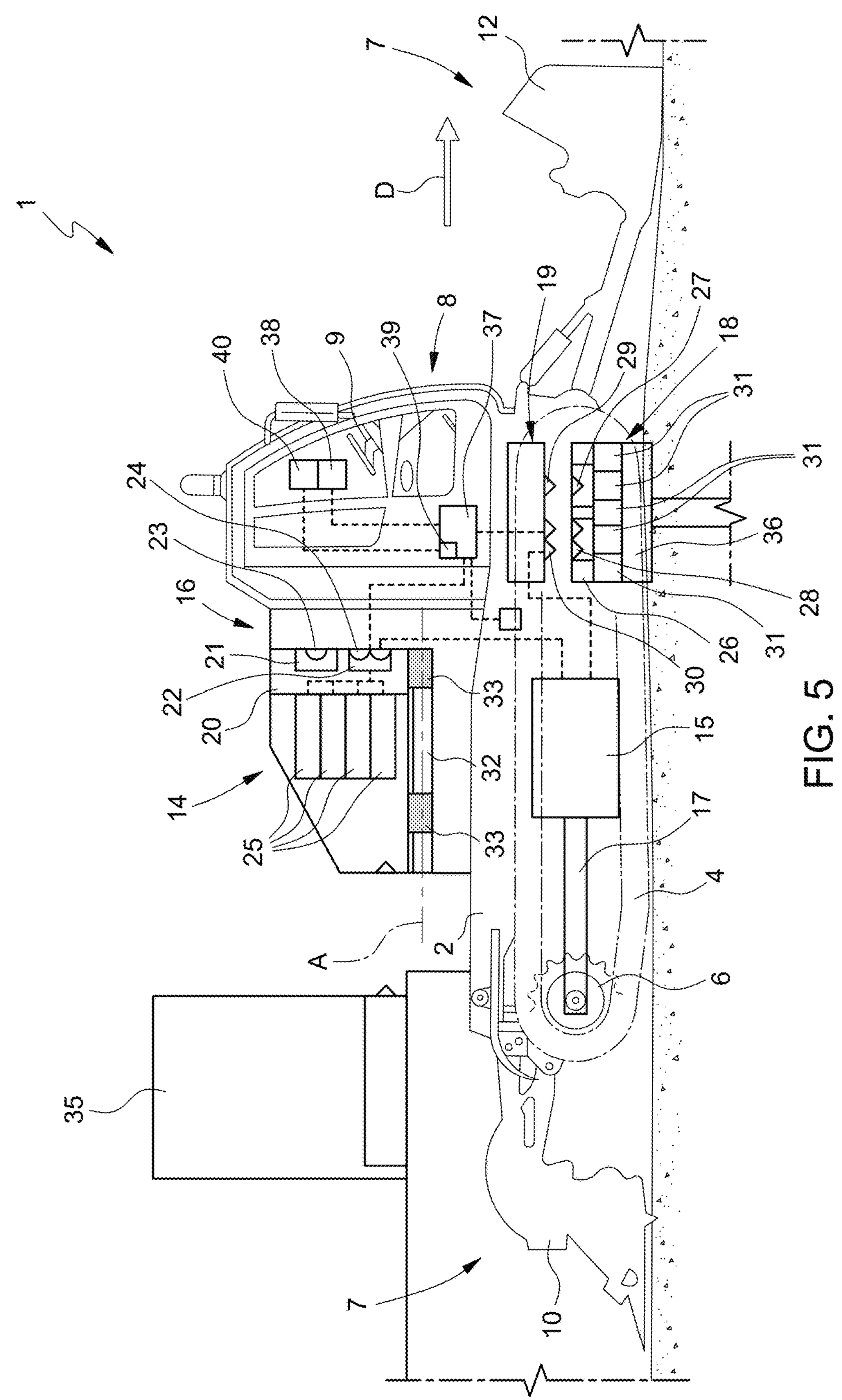

With reference to FIG. 5, when the energy storage assembly 18 is substantially discharged, the crawler vehicle 1 is led to a replacement area, where the replacement device 36 is located so as to remove and replace the energy storage assembly 18.

Once the connection interface 19 is correctly positioned above the replacement device 36, the replacement device 36 is lifted from the ground until the replacement device engages the energy storage assembly 18.

At this point, the replacement device 36 is moved downwards so as to disconnect the mechanical connectors 27 and 29 and the power connectors 28 and 30 from one another and remove the discharged energy storage assembly 18 from under the cabin 8.

Once the discharged energy storage system 18 has been removed, the replacement device 36 connects a further charged energy storage assembly 18 to the connection interface 19. In particular, during the connection step, the further charged energy storage system 18 is coupled to an upper end of the replacement device 36, which is lifted again from the ground until the mechanical connectors 27 and 29 and the power connectors 28 and 30 are connected to one another.

Figure 6:
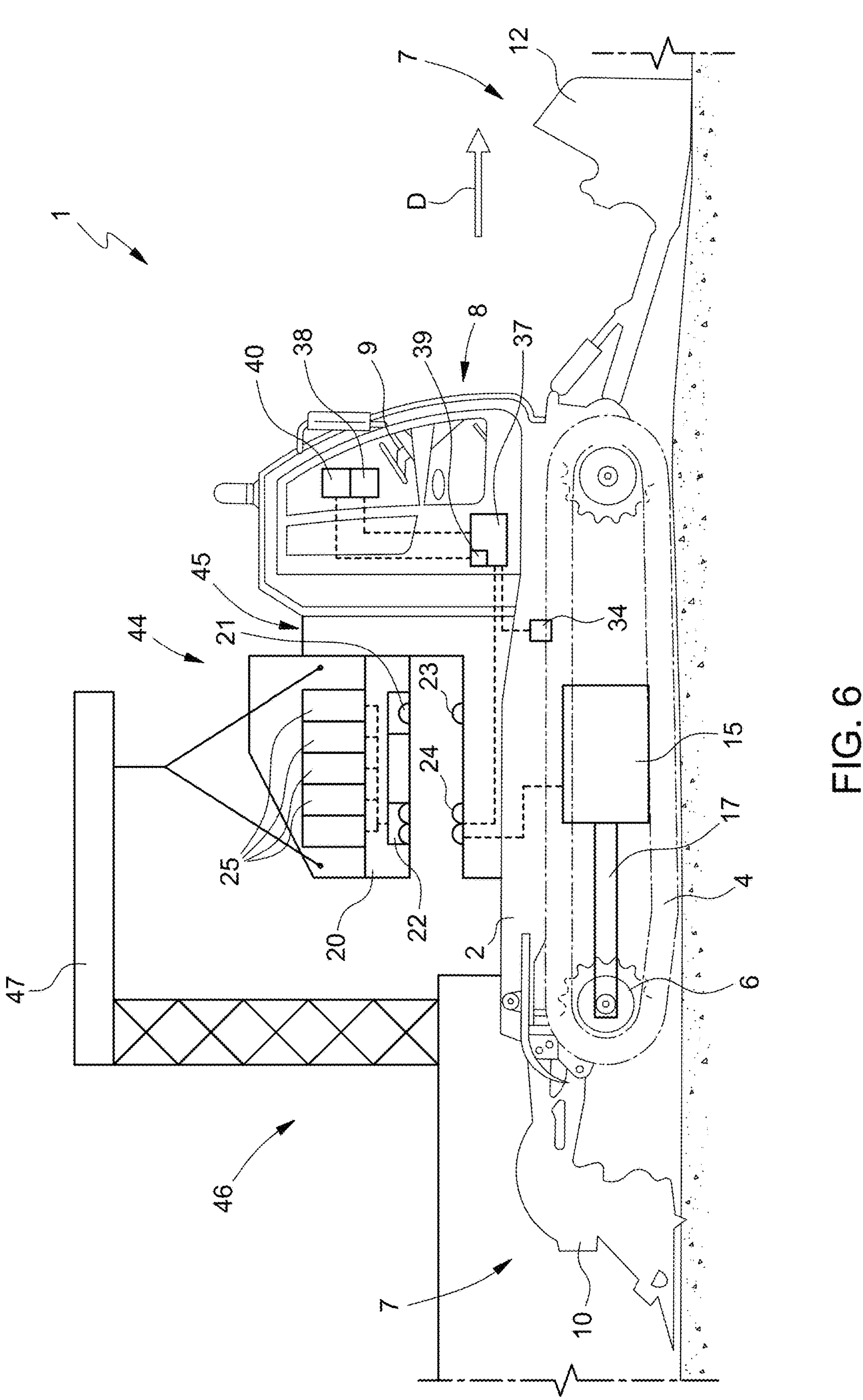
FIG. 6 is a side elevation view, with parts removed for greater clarity and schematic parts, of a variant of the crawler vehicle of FIG. 1 in a respective operating configuration.

FIG. 6 shows a variant of the disclosure, in which the crawler vehicle 1 comprises an energy storage assembly 44, which is not provided with sliding elements, and a connection interface 45, which is not provided with guides. In use and according to this variant, when the energy storage assembly 44 is substantially discharged, the crawler vehicle 1 is led to a replacement area, where a replacement device 46 is located so as to remove and replace the energy storage assembly 44. In particular, the replacement device 46 comprises a lifting system 47, such as a crane, configured to vertically lift and lower the energy storage assembly 44 relative to the connection interface 45.

Once the connection interface 45 is correctly positioned relative to the replacement device 46, the lifting system 47 is connected to the energy storage assembly 44.

At this point, the lifting system 47 is operated so as to lift the discharged energy storage assembly 44 relative to the connection interface 45, thus disconnecting the mechanical connectors 21 and 23 and the power connectors 22 and 24 from one another.

Once the discharged energy storage assembly 44 has been removed, the lifting system 47 lowers a further charged energy storage assembly 44 onto the connection interface 45 so as to connect the further charged energy storage assembly 44 to the propulsion system 15.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Finally, it is evident that variations can be made to the described embodiment of the present disclosure without departing from the scope of the following claims. That is, the present disclosure also covers embodiments that are not described in the detailed description above as well as equivalent embodiments that are part of the scope of protection set forth in the claims. Accordingly, various changes and modifications to the presently disclosed embodiments will be apparent to those skilled in the art.

The invention claimed is:

1. A crawler vehicle comprising:

a frame;

a first energy storage assembly configured to be removed from the crawler vehicle and to be replaced with a further first energy storage assembly;

a propulsion system configured to be powered by the first energy storage assembly;

a connection interface configured to selectively connect the first energy storage assembly to the propulsion system and selectively disconnect the first energy storage assembly from the propulsion system;

a position sensor assembly configured to detect a relative position of the connection interface with respect to a replacement device of the first energy storage assembly;

a first motorized track;

a second motorized track; and a transmission assembly configured to transmit power from the propulsion system to the first motorized track and to the second motorized track.

2. The crawler vehicle of claim 1, wherein:

the first energy storage assembly comprises:

a first mechanical connector, and a first power connector, the connection interface comprises:

a second mechanical connector configured to releasably engage the first mechanical connector, and a second power connector configured to be connected to the first power connector to transmit power to the propulsion system.

3. The crawler vehicle of claim 2, wherein the first energy storage assembly comprises a support element configured to couple with the connection interface and provided with the first mechanical connector and with the first power connector.

4. The crawler vehicle of claim 1, further comprising a cabin mounted on the frame, wherein the connection interface is arranged behind the cabin with respect to a travelling direction of the crawler vehicle.

5. The crawler vehicle of claim 4, wherein:

the connection interface comprises a guide, the first energy storage assembly comprises a sliding element configured to slide along the guide to connect the first energy storage assembly to the connection interface and disconnect the first energy storage assembly from the connection interface.

6. The crawler vehicle of claim 1, wherein the position sensor assembly comprises at least one of: a lidar, a radar, a video camera, and a GPS sensor.

7. The crawler vehicle of claim 1, further comprising:

a further connection interface, and a second energy storage assembly configured to be removed from the crawler vehicle and be replaced with a further second energy storage assembly.

8. The crawler vehicle of claim 7, wherein the further connection interface is arranged under a cabin of the crawler vehicle and is configured to selectively connect the second energy storage assembly to the propulsion system and selectively disconnect the second energy storage assembly from the propulsion system.

9. The crawler vehicle of claim 1, wherein each first energy storage assembly comprises one of: at least one battery configured to store electrical energy, and at least one tank configured to store hydrogen.

10. A method for managing an operation of a crawler vehicle, the method comprising:

powering a propulsion system of the crawler vehicle by an energy storage assembly;

transmitting power from the propulsion system to a first track of the crawler vehicle and a second track of the crawler vehicle;

detecting, by a position sensor assembly, a relative position of a connection interface with respect to a replacement device of the energy storage assembly;

removing, by the connection interface, the energy storage assembly from the propulsion system of the crawler vehicle, wherein the connection interface selectively connects the energy storage assembly to the propulsion system and selectively disconnects the energy storage assembly from the propulsion system; and replacing the removed energy storage assembly with a further energy storage assembly.

11. The method of claim 10, wherein the removed energy storage assembly is less loaded than the further energy storage assembly.

12. The method of claim 10, wherein the selectively connecting and selectively disconnecting comprise implementing a sliding of the energy storage assembly with respect to the connection interface.

13. The method of claim 10, wherein the selectively connecting and selectively disconnecting comprise lifting the energy storage assembly from the connection interface.

14. The method of claim 10, wherein the selectively connecting and selectively disconnecting comprise removing the energy storage assembly from under a cabin of the crawler vehicle.

* * * * *